United States Patent
Bolt et al.

(10) Patent No.: US 8,320,424 B2
(45) Date of Patent: Nov. 27, 2012

(54) OPTICAL COMPONENT CLEANLINESS AND DEBRIS MANAGEMENT IN LASER MICROMACHINING APPLICATIONS

(75) Inventors: Bryan C. Bolt, Beaverton, OR (US); David M. Hemenway, Beaverton, OR (US); Mark Kosmowski, Beaverton, OR (US); A. Grey Lerner, Portland, OR (US); Brady E. Nilsen, Beaverton, OR (US); Richard Pope, Beaverton, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 1735 days.

(21) Appl. No.: 11/565,356

(22) Filed: Nov. 30, 2006

(65) Prior Publication Data

US 2007/0127122 A1   Jun. 7, 2007

Related U.S. Application Data

(60) Provisional application No. 60/742,162, filed on Dec. 1, 2005.

(51) Int. Cl.
*H01S 3/22* (2006.01)
*H01S 3/223* (2006.01)

(52) U.S. Cl. .................................................. 372/55
(58) Field of Classification Search .............. 372/55
See application file for complete search history.

(56) References Cited

U.S. PATENT DOCUMENTS

| | | | |
|---|---|---|---|
| 5,825,801 A * | 10/1998 | Nishida et al. | 372/99 |
| 6,330,261 B1 | 12/2001 | Ishihara et al. | |
| 6,567,450 B2 | 5/2003 | Myers et al. | |
| 6,795,474 B2 | 9/2004 | Partlo et al. | |
| 6,904,073 B2 | 6/2005 | Yager et al. | |

FOREIGN PATENT DOCUMENTS

JP      4-26687      3/1992

OTHER PUBLICATIONS

International Application Published Under the Patent Cooperation Treaty (PCT) No. WO 2007/064947A3, Jun. 7, 2007, 11 Pgs.

\* cited by examiner

*Primary Examiner* — Patrick Stafford
(74) *Attorney, Agent, or Firm* — Stoel Rives LLP

(57) ABSTRACT

Preferred embodiments of a purge gas port, laser beam attenuating input window, and laser shutter constitute subsystems of a UV laser optical system in which a laser beam is completely enclosed to reduce contamination of the optical system components. Purge gas is injected through multiple locations in a beam tube assembly to ensure that the optical component surfaces sensitive to contamination are in the flow path of the purge gas. The input window functions as a fixed level attenuator to limit photopolymerization of airborne molecules and particles. Periodically rotating optical elements asymmetrically in their holders reduces burn damage to the optics.

6 Claims, 7 Drawing Sheets

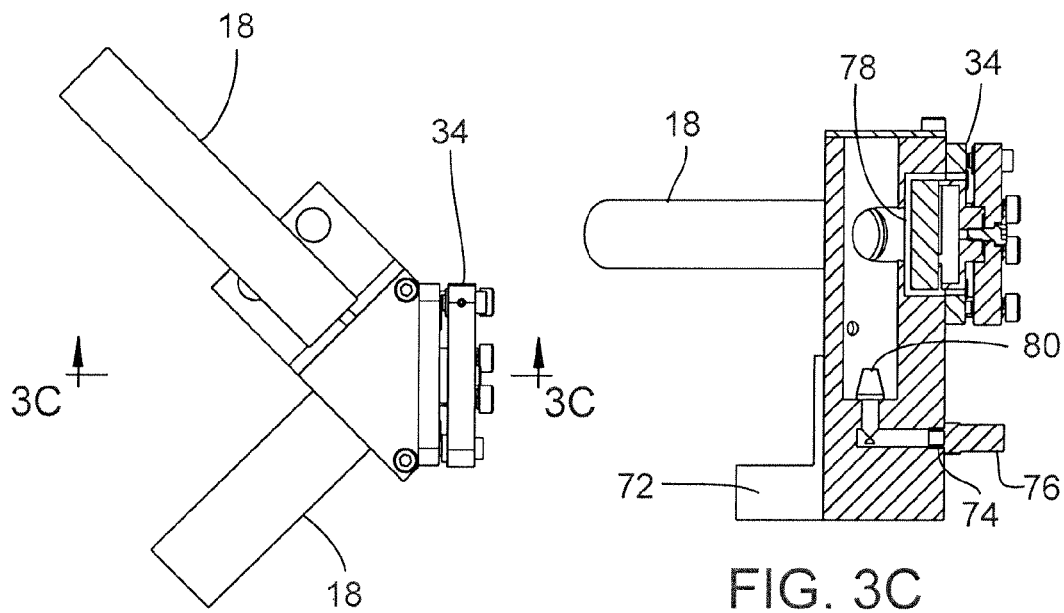
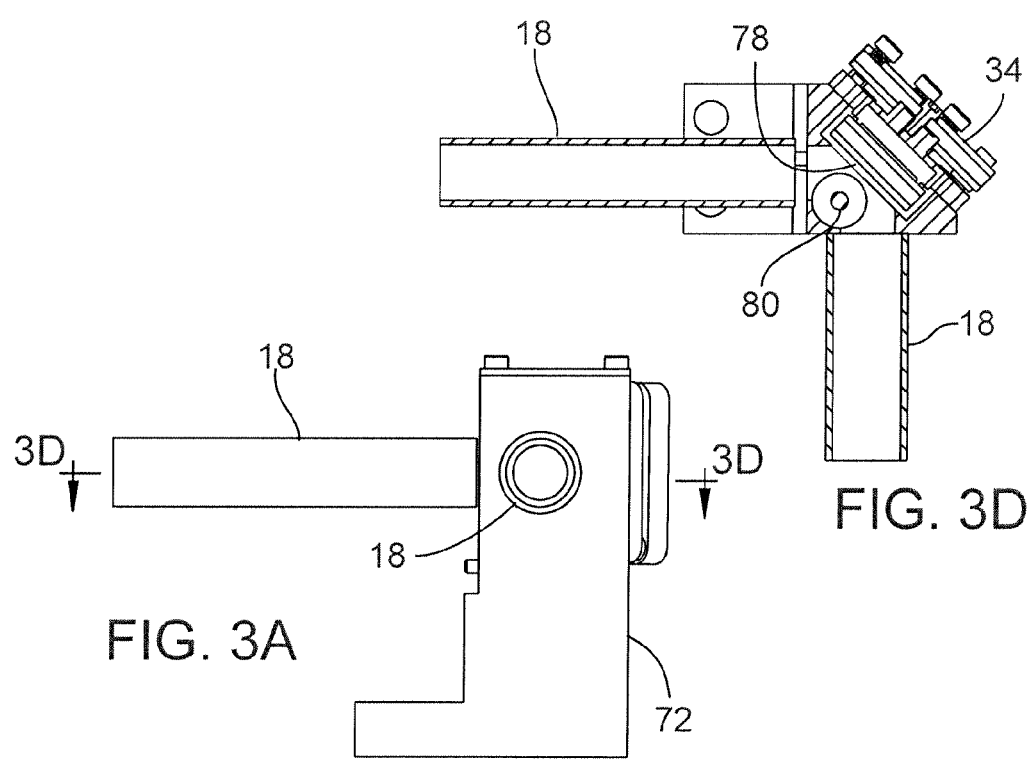

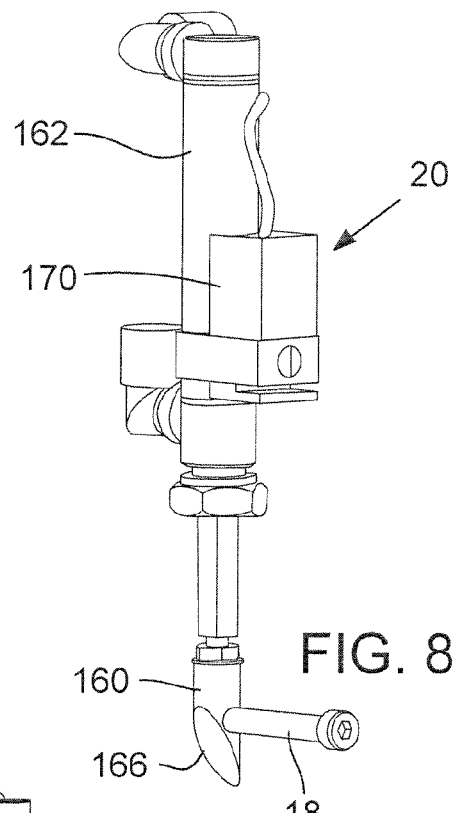
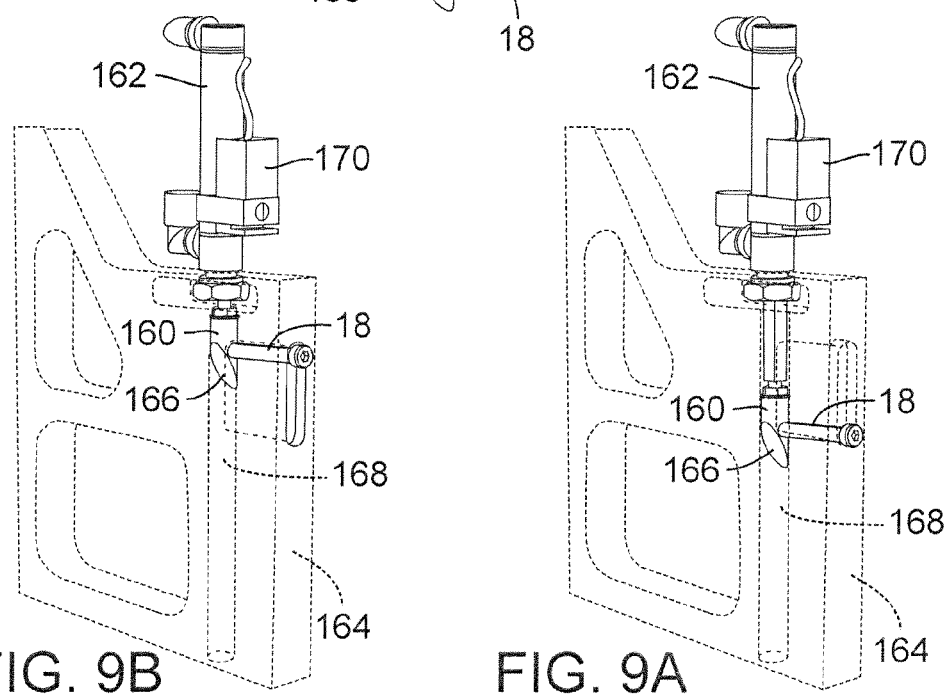

OPTICAL COMPONENT CLEANLINESS AND DEBRIS MANAGEMENT IN LASER MICROMACHINING APPLICATIONS

RELATED APPLICATION

This application claims benefit of U.S. Provisional Patent Application No. 60/742,162, filed Dec. 1, 2005.

COPYRIGHT NOTICE

© 2006 Electro Scientific Industries, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

The present disclosure relates to laser-based workpiece processing systems and, in particular, to optical component cleanliness and debris management in laser micromachining applications performed in such systems.

BACKGROUND INFORMATION

The state of the art for sealing laser beam paths in semiconductor processing equipment entails enclosing the entire optics volume with a cabinet style enclosure. Some designs incorporate a purging system using some sort of clean dry air or inert gas. Beam tubes are also used in other laser applications outside of micromachining, such as integrated circuit error correction. Most recent designs of UV optic rails and beam paths use covers to protect the optical components. Neither purge gas inside the enclosed volume nor beam tubes with purge gas have been used in laser micromachining applications.

It is well known in the laser industry that UV wavelength laser light can be very damaging to system optical components. The photon energy given by $E=h\nu$ (where $h=$Planck's constant and $\nu=$optical frequency) for UV light is sufficient to break and reform bonds in many common airborne molecular contaminants (AMCs). In this process known as photopolymerization, polymers are formed on optical surfaces that intersect the laser beam. The polymers cloud the lenses and mirrors, reducing optical transmittance of the system, and causing beam distortion that degrades performance. Similar problems may occur in the presence of particulate contamination. Particulates can become vaporized, and in turn, polymerized onto optical surfaces. Additionally, in the presence of high instantaneous energy pulsed beams, an acoustic "shock" wave may be formed as a particulate is ablated. This acoustic shock wave may damage optical coatings, substrates, or both, as it propagates into an optical component.

Currently available pulsed lasers with nanosecond, picosecond, or femtosecond pulse widths suffer optical degradation resulting from the high peak powers incident upon their optical components. Often, based upon the application, the laser may deliver excess output energy that must be attenuated. Currently available attenuators, often composed of a half-wave plate and polarizer combination (or a variation of this theme), are inserted into the path of the laser beam to attenuate the laser beam by manipulating its polarization state. Although the technique of using a half-wave plate and polarizer offers the ability to adjust the level of attenuation, the attenuator assembly usually must be placed after several optical components "downstream" from the laser output. The reason is that the half-wave plate and polarizers work best when collimated or nearly collimated light is incident upon them. In addition, the half-wave plate, in the case of a sealed laser rail, would not make a very good window into the sealed portion because waveplates are prone to contamination, are fragile, and are temperature sensitive.

A laser rail, forming part of a laser optical system and sealed from the outside environment, uses input and output windows of the optical system to allow the beam to pass into and out of the sealed portion of the laser rail. Moreover, it is desirable to decrease the amount of laser light incident on all optical components because the intensity of the laser light (in $W/cm^2$, peak $W/cm^2$, or $J/cm^2$) is proportional to the age of the optics. Therefore, in an ideal laser system that produces excessive laser power, the very first component in the optical system would be an attenuator of some type. In summary, it would be desirable to provide the same optical element(s) functioning as an input window and an attenuator.

Laser optical systems include laser shutters that can be divided into two different categories. They include modulation, exposure, and pulse gating shutters and safety interlock and process control shutters. Safety interlock shutters, which are of interest here, intermittently block the laser beam by means of a material that is opaque to the laser wavelength and is caused to move selectively in and out of the line of propagation of the laser beam. The blocked laser beam is reflected into or onto a laser beam "block" or "dump," which serves to absorb and attenuate the blocked beam. Shutter actuation devices include, but are not limited to, electro-mechanical (solenoid), electrical, and magnetic devices.

A shutter operating as a safety (rather than a modulation) device opens and closes at a low frequency of repeated operation (<<1 Hz). The open and closed positions are sensed and fed back to the operating system. A properly designed laser shutter blocks laser emission and does not cause it to reflect back into the lasing cavity. Shutter construction materials should be free from components that are likely to contaminate the optical system.

SUMMARY OF THE DISCLOSURE

Preferred embodiments of a purge gas port, laser beam attenuating input window, and laser shutter constitute subsystems of a UV laser optical system in which the light beam path is completely enclosed to reduce contamination of the optical system components. Purge gas is injected through multiple, e.g., nine, different locations in a beam tube assembly to make certain that the optical component surfaces sensitive to contamination are in the flow path of the purge gas. Clean, dry air is preferred over an inert purge gas because of the availability of compressed air in semiconductor device fabrication facilities and the absence of ozone formation at the preferred 355 nm operating wavelength. All of the beam tube assembly components are preferably made from nickel plated aluminum, stainless steel, brass, and Teflon® materials because of their outgasing properties. The flow level of the purge gas is determined by two criteria: (1) maximize gas flow without generating turbulence in the beam spot on the work surface, and (2) provide a minimum number of air volume exchanges each hour. Five air volume exchanges each hour are chosen as a minimum for the embodiment described. Porous diffusers are used at the purge gas injection points to reduce turbulence-induced beam motion. Purge gas flow in a controlled environment containing the laser beam path allows the laser rail to last longer than one that is not equipped with purge gas flow through a beam tube assembly.

An input window functioning as a fixed level attenuator is formed of a transparent optical material including, for example, but not limited to, fused silica with plano-plano surfaces oriented at 45 degrees with respect to the incident laser beam for S-polarization. Since this optical component acts as the input window assembly into a sealed optical assembly, it is desirable to have a mounting system that is resistant to perturbations from mechanical components sealing the optical system (in this case, the covers) that would in turn cause potential misalignment of the laser beam. Preferred mounting hardware is, therefore, resistant to any stresses caused by the covers as it accomplishes beam attenuation and damage prevention. Lastly, since it sees the highest $W/cm^2$, and is exposed to the external environment, the input window has the highest probability of damage resulting from external contaminants polymerizing or burning onto the outer surface. The input window is, therefore, slightly offset from the centerline of the laser beam and is of sufficient size so that, if a burn occurred, the input window could be rotated to a new "clean" portion of the optical surface. When the input window is rotated in response to damage to the external optical surface, no additional beam steering occurs. When the covers are installed to seal the optical assembly, no additional beam steering occurs from the stresses of the cover fitted on the opto-mechanical assembly.

A laser shutter composed of pneumatic cylinder retracts and extends to position a metal shutter blade out of and into the path of the laser beam. A magnetic reed switch senses the position of the cylinder and feeds a position signal back to a system control computer. In the blocked state, the shutter blade reflects the laser beam into a feature of a structural gusset to safely attenuate the beam. The shutter mechanism is partly covered and shares a clean air purge source with the bulk of the laser optical assembly. Three laser shutter design features include (1) portions of the mechanism exposed to laser light are made from non-outgasing materials to limit optical contamination; (2) the pneumatic cylinder imparts a motive force to the shutter blade that does not contain materials likely to cause contamination of the optical components and does not generate heat and thereby ensures that beam steering resulting from the heat generation is kept to a minimum; and (3) features containing and attenuating the reflected/blocked beam are integral to the assembly and require no external components.

The shutter blocks the laser radiation directly after it emanates from the output window of the laser head. This occurs automatically upon disruption of the laser safety-interlock circuits or through manual command of the system control computer. Waste heat generated by the shutter actuator and the presence of materials known to cause optical component contamination are eliminated through the use of this device.

Additional objects and advantages relating to this disclosure will be apparent from the following detailed description of preferred embodiments thereof which proceeds with reference to the accompanying drawings.

BRIEF DESCRIPTION OF THE DRAWINGS

FIGS. 3A, 3B, 3C, and 3D are, respectively, side elevation, plan, side cross-sectional, and plan cross-sectional views of a mirror mount assembly used in the laser optical system of FIG. 1.

FIG. 8 is an isometric view of a laser shutter assembly that is installed adjacent to an exit window of a laser head incorporated in the laser optical system of FIG. 1.

FIGS. 9A and 9B are isometric views of a laser shutter assembly mounted in a structural gusset and shown with a shutter blade in, respectively, extended (light blocking) and retracted (light transmitting) positions.

DETAILED DESCRIPTION OF PREFERRED EMBODIMENTS

Figure 1:
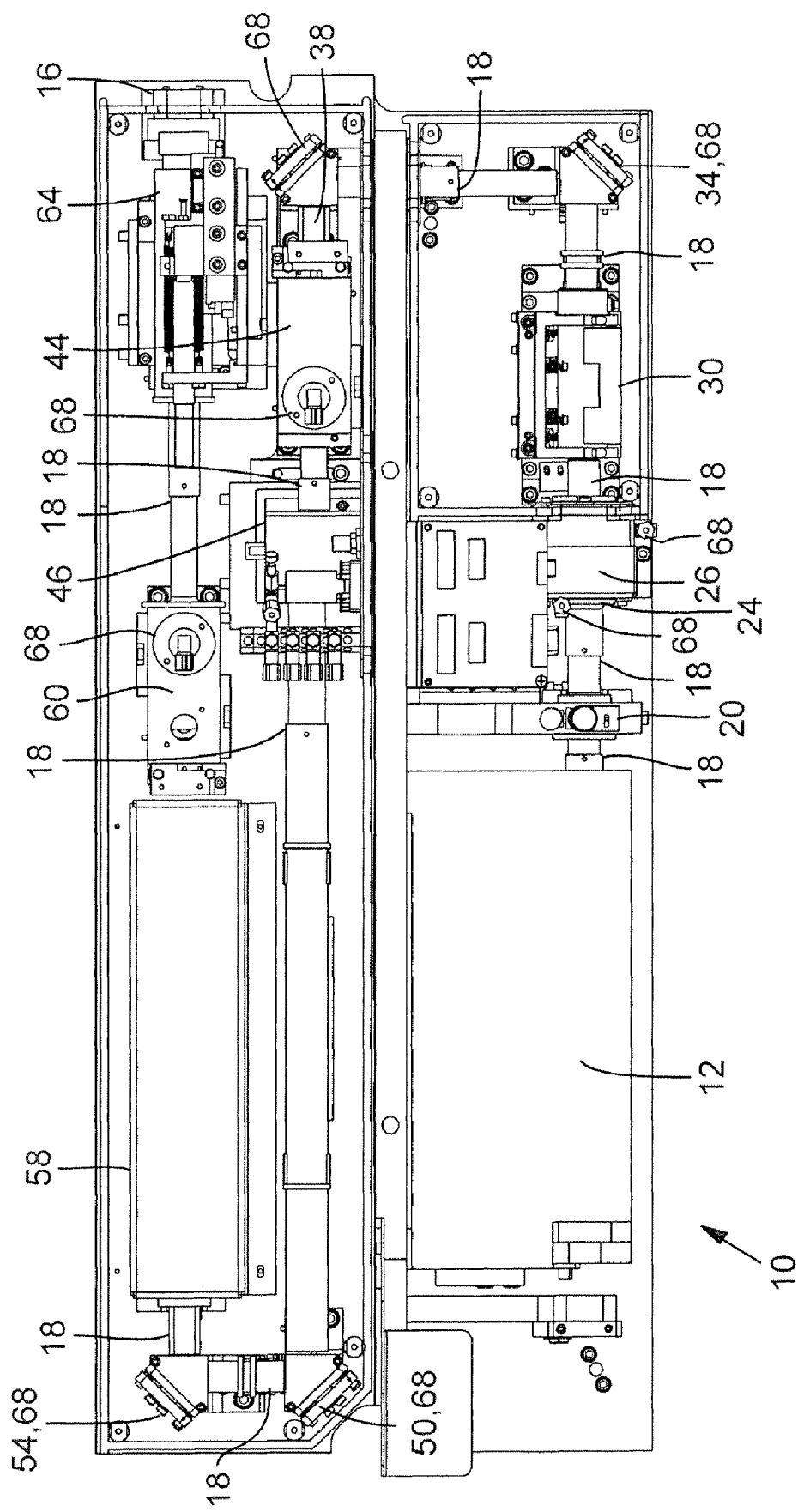
FIG. 1 is a plan view of a laser optical system with its housing cover removed.
Figure 2A:
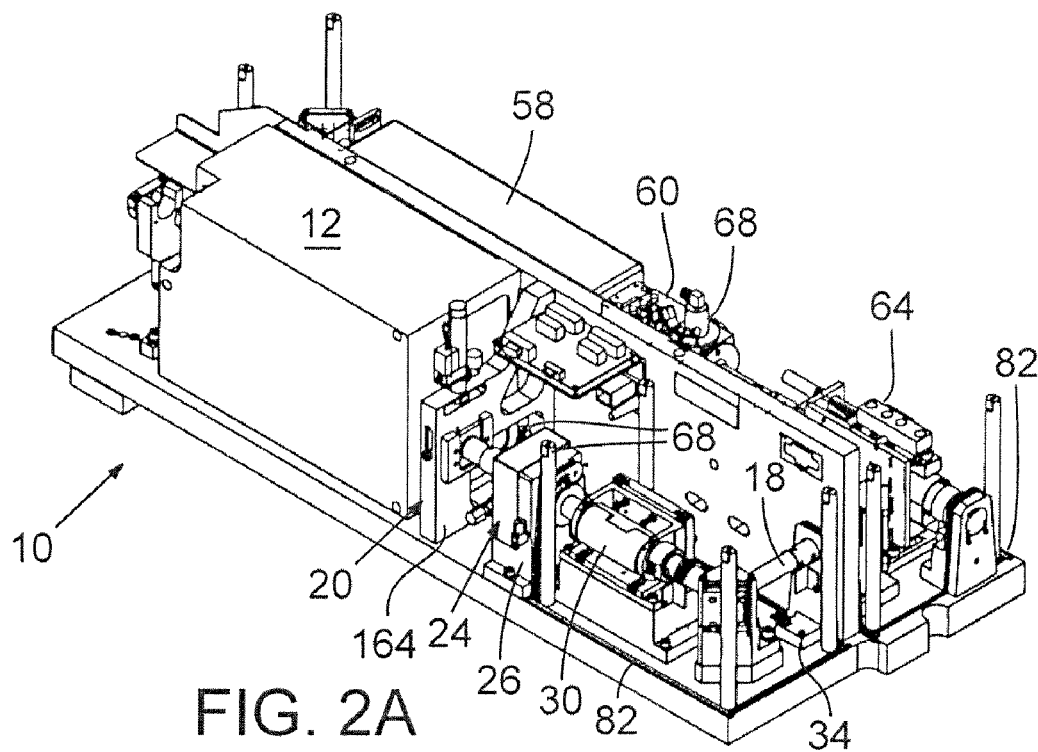
FIGS. 2A and 2B are isometric views of opposite sides of the laser optical system of FIG. 1, showing where a laser head and a spatial filter, respectively, are located.
Figure 2B:
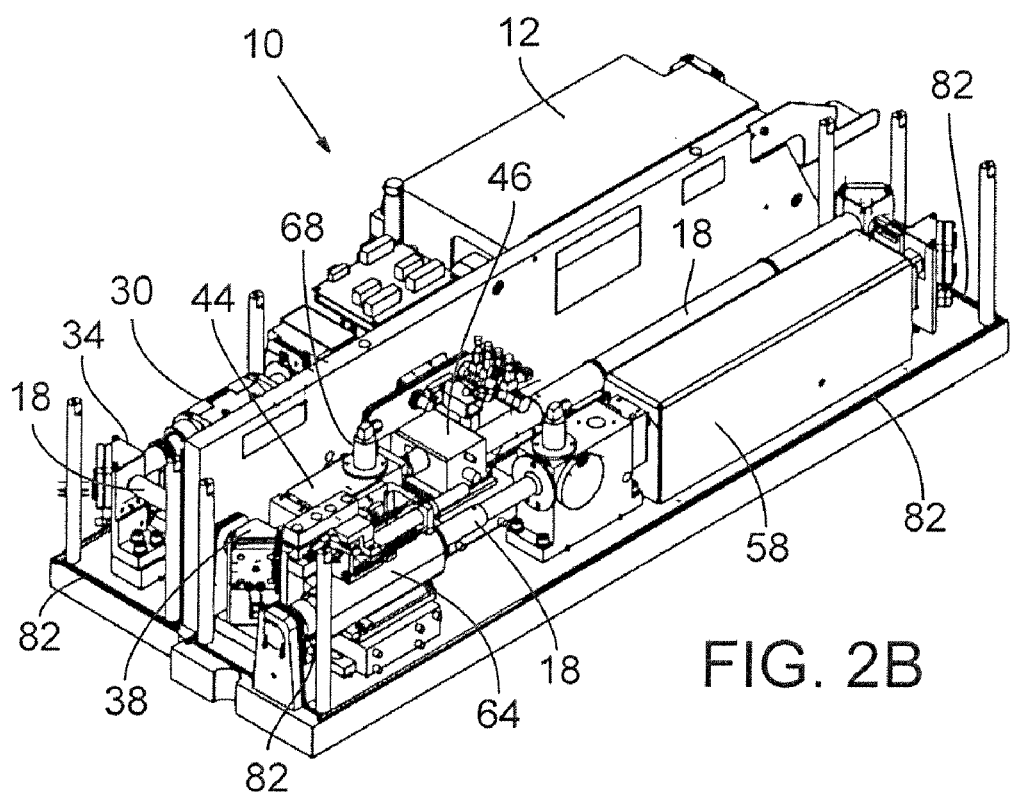

The laser optical system in which preferred embodiments of the above-summarized three subsystems are included is shown in FIGS. 1, 2A, and 2B. FIG. 1 is a plan view of a laser optical system 10 with its cover removed, and FIGS. 2A and 2B are isometric views of opposite sides of the laser optical system 10 of FIG. 1, showing where a laser head and a spatial filter, respectively, are located. FIGS. 1, 2A, and 2B show the laser rail assembly without the outer covers that seal the entire laser optical system 10. All of the beam tube sets 18 are visible in these three drawing figures and are specifically identified in FIG. 1.

With reference to FIGS. 1, 2A, and 2B, the output beam of a laser head 12 (housed within a separate cover) propagates along a beam path in the general shape of an "S" through an exit window 16 of laser optical system 10. The output beam propagates through the interior regions of multiple beam tube sets 18 to and from enclosed optical components positioned along the laser beam path. The beam tube set assembly confines the laser beam in an atmospherically controlled environment within laser optical system 10.

The output beam of laser head 12 propagates through a laser shutter 20 to a light beam attenuating input window 24 and its associated support member or bulkhead 26. Laser shutter 20 and beam attenuating input window 24 are two subsystems described in greater detail below. The attenuated laser beam propagates through a pre-expander assembly 30 to a first turn mirror assembly 34 and a second turn mirror assembly 38. Turn mirror assemblies 34 and 38 cooperate to reverse the direction of the laser beam path. The laser beam reflects off the turn mirror of second turn mirror assembly 38 and propagates through a first manual attenuator 44 and an acousto-optic modulator (AOM) 46 to a third turn mirror assembly 50 and a fourth turn mirror assembly 54. Turn mirror assemblies 50 and 54 cooperate to reverse the laser beam path to its original propagation direction. The laser beam reflects off the turn mirror of turn mirror assembly 54 and propagates through a spatial filter 58 (housed within a separate cover), a second manual attenuator 60, and a variable beam expander assembly 64 to exit window 16.

Each of turn mirror assemblies 33, 38, 50, and 54; manual attenuators 44 and 60; and the input and output of beam attenuating input window 24 is equipped with a gas purge port 68 for injecting purge gas flow through the beam tube assembly. (Laser head 12 also includes a gas purge port, which is not shown.) Purge gas injection in a structure integrated with the enclosed laser beam tube assembly is a subsystem described in greater detail below.

FIGS. 3A, 3B, 3C, and 3D are, respectively, side elevation, plan, side cross-sectional, and plan cross-sectional views of an optical component or mirror mount assembly 72 for first turn mirror assembly 34. (Turn mirror assembly 34 is used by way of example; mirror mount assembly 72 can be used with any of the other turn mirror assemblies 38, 50, and 54.) FIG. 3C shows the integrated purge features of mirror mount assembly 72, in which the placement of a purge gas inlet port 74 minimizes the ability of a purge hose 76 to deflect the mirror mount. The laser beam propagating through the interior of light beam path directing assembly 18 enters mirror mount assembly 72 and is incident on an exterior light beam-receiving or optical surface 78. Purge gas entering through inlet port 74 makes a 90-degree bend, and flows through a gas diffuser 80 and upward across optical surface 78 to prevent accumulation of contaminants on it. A preferred gas diffuser 80 is a Model Series 4450K bronze/steel exhaust muffler/filter, which is manufactured by McMaster-Carr, Los Angeles, Calif., and which operates at 300 psi (2.1 MPa) maximum pressure and exhibits 40 µm filtration.

Purge rates for the laser rail are preferably determined by increasing the flow rate for a particular inlet port 74 until the laser beam becomes unstable, as measured by photodiode position detectors at the beam spot. When the gas flow deflects the laser beam, the flow rate is noted and reduced by 20 percent. This flow reduction eliminates any gas turbulence that caused the beam to become unstable.

The housings for attenuators 44 and 60 and the mount for beam attenuating input window 24 are also configured with the integrated purge features described and shown for mirror mount assembly 72. Gas flow into the attenuators is determined by the degree of change in laser power reduction. The purge gas flow removes the humidity in the cavity where the optical component is contained and thereby changes its attenuation properties.

The hardware described above has the benefit of controlling the flow of the purge gas so that fresh purge gas is constantly introduced to the beam path and optical surfaces where it is needed. In a sealed assembly without purge, residual contaminants would eventually lead to degradation of the optical surfaces even if at very low concentrations. By constantly diluting and removing existing contaminants with a flow of purge gas, the chance of those contaminants coming into contact with optical surfaces is greatly reduced. If the purge gas were introduced into a large sealed assembly without the benefit of tubes, purge ports, or both, localized at the optical surfaces, controlling flow to individual optical components would be impossible. Stagnation zones would likely exist that could give contaminants a chance to accumulate.

The sealed outer cover (not shown) fitted against a gasket 82 (FIGS. 2A and 2B) affords an added benefit of a second barrier with predetermined exhaust outlets for the purge effluent. The sealed outer cover helps reduce or eliminate the possibility of contaminants outside of the optical rail from migrating into the assembly and onto optical surfaces.

Figure 4:
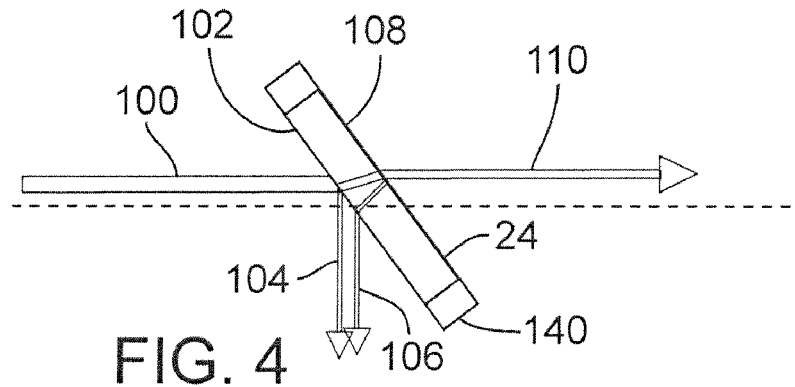
FIG. 4 is a simplified diagram showing a path of light propagating through a beam attenuating input window incorporated in the laser optical system of FIG. 1.

FIG. 4 is a simplified theoretical diagram showing the path of light propagating through beam attenuating input window 24. With reference to FIG. 4, S-polarized input light beam 100 is incident, at a 45° angle, on an entrance surface 102 of a fused silica window 24. An S-polarized low intensity light beam 104 reflects off entrance surface 102 as the remainder of light beam 100 enters and propagates through the interior of window 24. An S-polarized low intensity light beam 106 reflects off an exit surface 108, propagates back through the interior of window 24, and exits entrance surface 102. An S-polarized output light beam 110 refracted and attenuated by window 24 propagates through exit window 108 along a beam path that differs from the beam path of input light beam 100.

The following expressions for Fresnel reflections are used to calculate light reflection as a function of angle:

$$P\text{-Polarization: } R_P = \frac{\tan^2(\theta_i - \theta_t)}{\tan^2(\theta_i + \theta_t)}$$

$$S\text{-Polarization: } R_S = \frac{\sin^2(\theta_i - \theta_t)}{\sin^2(\theta_i + \theta_t)}$$

where $\theta_i$ is the incident angle and $\theta_t$ is the transmitted angle in the glass. The angles are found per Snell's Law: $n_i \sin \theta_i = n_t \sin \theta_t$, where $n_i$ is the index of refraction of air and $n_t$ is the index of refraction in the glass. An example of reflection loss calculations for fused silica at 1024 nanometers for n=1.45 is given on FIG. 4. Beam attenuating input window 24 by intentional design introduces, therefore, light loss at a fixed value established in accordance with the expressions set forth above.

Figure 5:
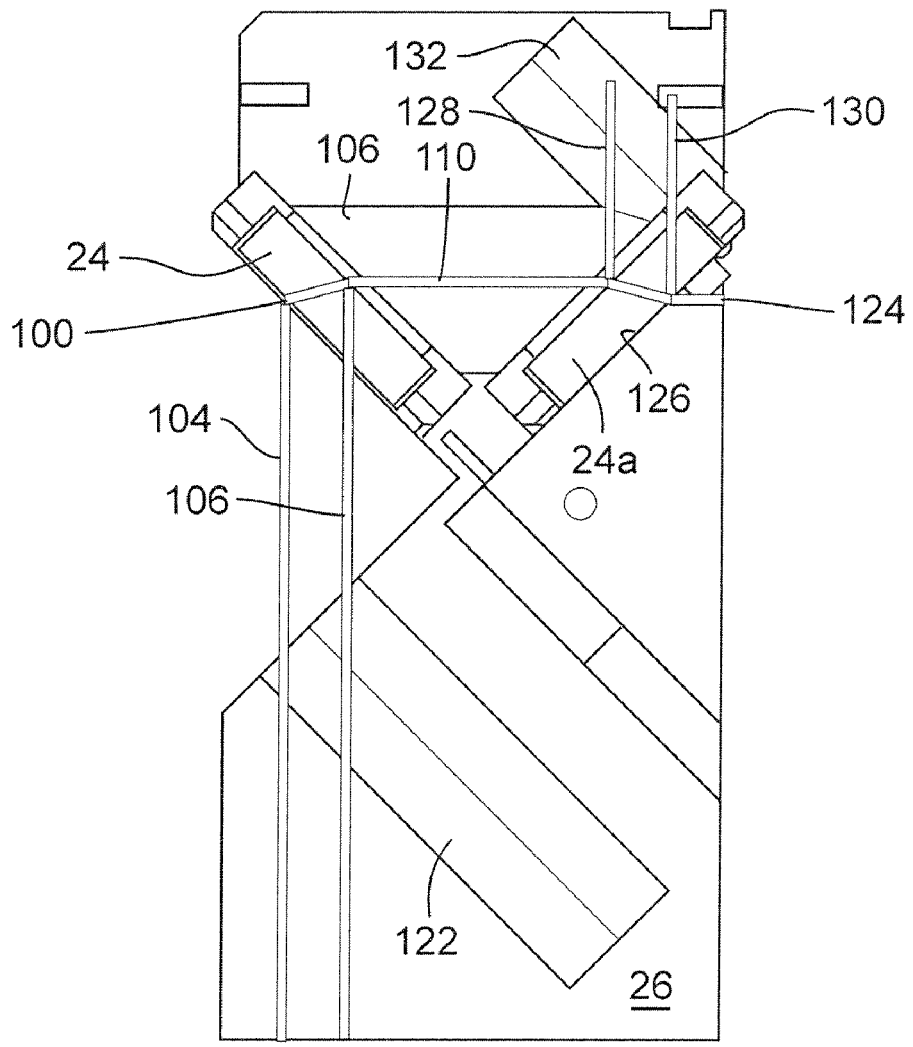
FIGS. 5, 6, and 7 are, respectively, cross-sectional, rear side elevation, and exploded views of a preferred implementation of a light beam attenuating input window set in a window bulkhead of the laser optical system of FIG. 1.
Figure 6:
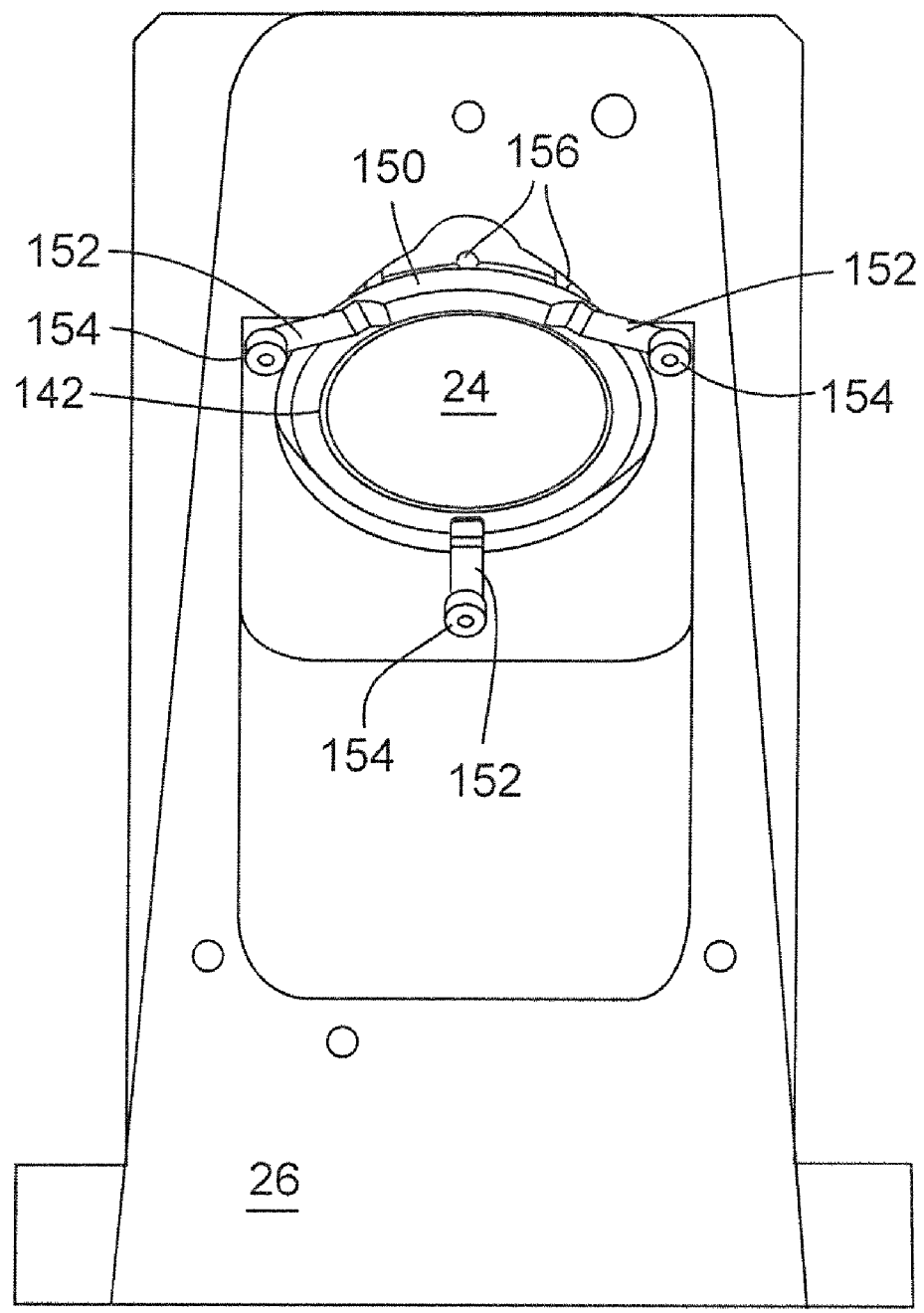
Figure 7:
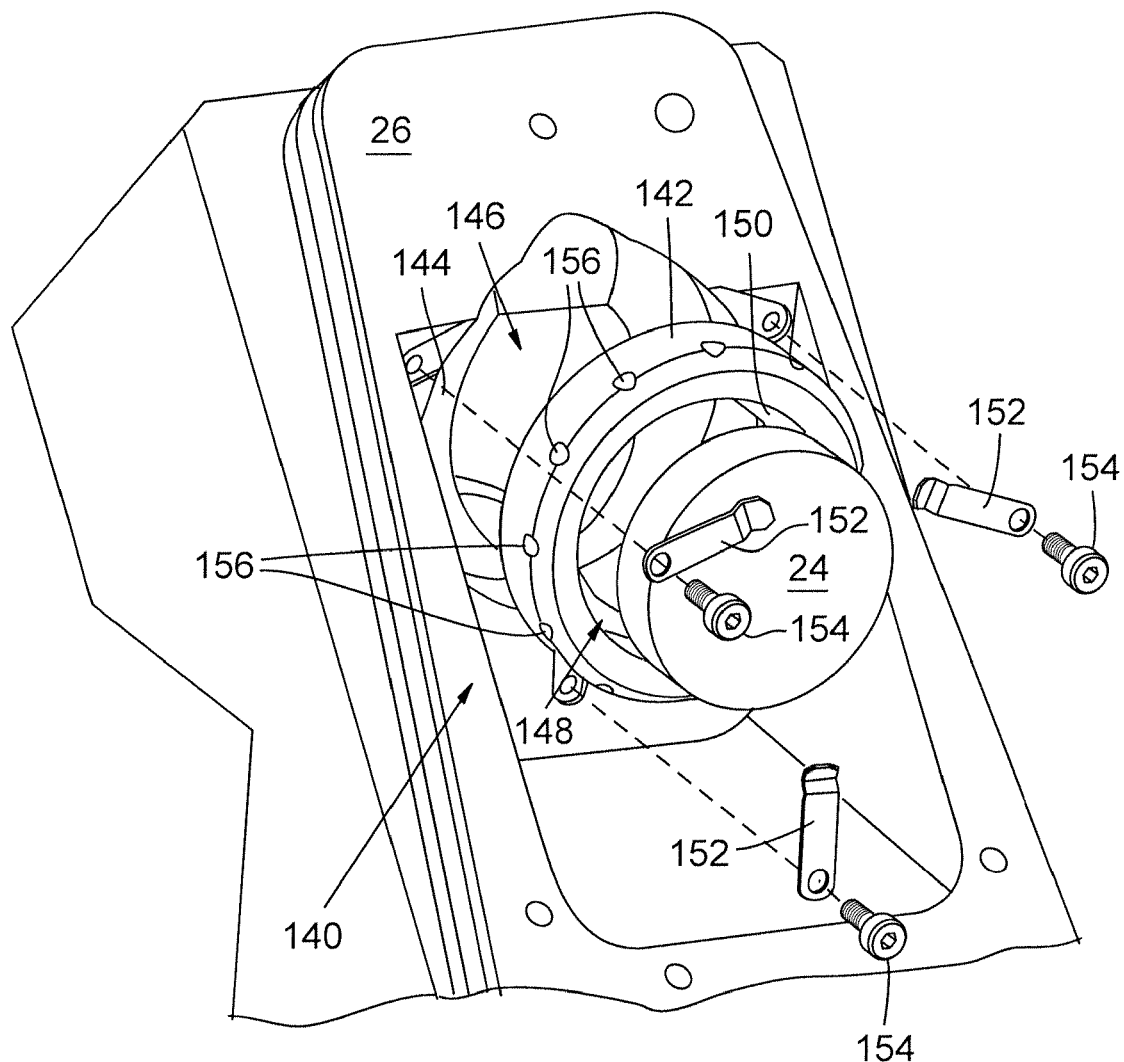

FIGS. 5, 6, and 7 are, respectively, cross-sectional, rear side elevation, and exploded views of an actual implementation of a light beam attenuating input window 24 set in a window bulkhead 26 of laser optical system 10.

With reference to FIG. 5, input light beam 100 is processed and output light beam 110 is formed as described with reference to FIG. 4. Low intensity reflected light beams 104 and 106 propagate to a beam dump 122, which absorbs them. A second beam attenuating window 24a is positioned in window bulkhead 26 to receive output light beam 110 propagating through a sealed beam tube 18. Beam attenuating window 24a is preferably made of the same optically transparent material as that of beam attenuating input window 24 and is set at an angle to provide added attenuation and an output light beam 124 propagating through an exit surface 126 and along the same beam path as that of input light beam 100. Low intensity reflected light beams 128 and 130 analogous to the respective low intensity reflected light beams 104 and 106 propagate to a beam dump 132. Skilled persons will appreciate that low intensity internal reflections within attenuating windows 24 and 24a propagate through exit surfaces 108 and 126 and may be blocked by an aperture (not shown) positioned to allow passage of output light beam 124.

With reference to FIGS. 6 and 7, beam attenuating input window 24 is set in and releasably coupled to window bulkhead 26 by a window mounting assembly 140. Window mounting assembly 140 permits manual rotation of attenuating input window 24 to move a damaged optical surface away from the laser beam path. Window mounting assembly 140 includes an annular holder 142 that is sized to rest on a support surface in the form of an annular shoulder 144 of a stepped opening 146 in window bulkhead 26.

Annular holder 142 includes a shallow recess 148 terminated by a smooth annular flange surface 150 against which attenuating input window 24 rests. Three spring clips 152 fixed by bolts 154 in window bulkhead 26 press against attenuating input window 24 to secure it in place in annular holder 142. Annular holder 142 includes around its periphery multiple angularly spaced apart wrench holes 156. Loosening bolts 154 and placement of a tool in one of the exposed wrench holes 156 allow a user to accomplish manual rotation of annular holder 142 along annular shoulder 144 to present a different optical surface region to the incident laser beam.

Thus, this opto-mechanical design achieves with a single optical assembly an input window that is positioned in the sealed portion of the optical system and a fixed level of attenuation that is set into the optical system. The mounting system provides a quick solution, if a burn were to occur, by rotating the window about the laser beam so as to reduce end user down time.

FIG. 8 is an isometric view of a laser shutter assembly 20, which is installed in laser optical system 10 adjacent the exit window of laser head 12 (FIG. 1). Laser shutter assembly 20 includes a shutter blade 160 formed of an electroless nickel-plated aluminum cylinder that is mounted to a free end of a normally extended, nonrotating pneumatic cylinder 162. FIGS. 9A and 9B are isometric views of laser shutter assembly 20 mounted in a structural gusset 164 and shown with shutter blade 160 in, respectively, extended (light blocking) and retracted positions. Structural gusset 164 is mounted to laser shutter assembly 20 in position for connection to the beam tube set 18 that is sealed against the exit window of laser head 12 (FIG. 1).

In an unpressurized state, the extended pneumatic cylinder 162 positions shutter blade 160 such that it blocks the laser beam. The blocked beam reflects off the angled face 166 of blade 160 and is directed down a hole 168 drilled in gusset 164 and functioning as a beam dump. The reflected beam undergoes subsequent reflections off the curved rough surface of the interior surface of beam dump 168. The structural components serve as adequate thermal mass for absorbing the reflected energy, and the numerous internal diffuse reflections ensure that there is no collimated retro-reflection of the blocked beam back into laser head 12. In a pressurized state, pneumatic cylinder 162 retracts and thereby removes shutter blade 160 from the laser beam path. The extended and retracted positions are sensed with a magnetic reed switch 170 and fed back to the system control computer (not shown).

The use of a pneumatic actuator minimizes waste-heat generation, and the incorporation of an integral beam dump provides a compact design. The laser shutter mechanism incorporates no materials that, when exposed to the laser radiation during normal use, outgas contaminants detrimental to the optical components in laser optical system 10. The laser shutter is operated completely manually during laser rail assembly and alignment. Easy manual operation during assembly is a benefit achieved with this laser shutter design.

It will be obvious to those having skill in the art that many changes may be made to the details of the above-described embodiments without departing from the underlying principles of the invention. The scope of the present invention should, therefore, be determined only by the following claims.

The invention claimed is:

1. Light beam path directing assembly including a gas diffuser configured to prevent accumulation of contaminants on a light beam-receiving surface of an optical component included as part of the assembly, comprising:
   an optical component mount having an interior region within which a light beam can propagate along a light beam path;
   an optical component having a light beam-receiving surface positioned within the interior region to intersect the light beam path so that the light beam propagating within the interior region is incident on the light beam-receiving surface; and
   a gas diffuser and fluid flow delivery components cooperating in fluid communication with the optical component mount to deliver within the interior region a diffuse stream of particle-filtered gas localized at and flowing across the light beam-receiving surface, the diffuser configured to distribute the localized stream of particle-filtered gas at a sufficient flow rate to prevent formation of stagnation zones and consequent accumulation of contaminants on the light beam-receiving surface while not appreciably disturbing the stability of the light beam propagating within the interior region.

2. The assembly of claim 1, in which the gas diffuser is positioned within the optical component mount and is in direct fluid communication within the interior region.

3. The assembly of claim 1, further comprising a gas inlet port in fluid communication with a gas flow channel formed in the optical component mount and opening into the interior region, the gas inlet port being isolated from the optical component to prevent displacement of the light beam-receiving surface in response to manipulation of an external gas delivery conduit providing a supply of gas to the gas inlet port.

4. The assembly of claim 1, in which the optical component is of a type that changes the propagation direction of the light beam incident on the light beam-receiving surface.

5. The assembly of claim 4, in which the optical component includes a mirror.

6. The assembly of claim 4, in which the optical component includes a light beam attenuator.

* * * * *